United States Patent [19]

Kubokawa

[11] Patent Number: 5,615,198
[45] Date of Patent: Mar. 25, 1997

[54] OPTICAL HEAD AND IMAGE RECORDING APPARATUS INCLUDING THE SAME

[75] Inventor: Hideji Kubokawa, Chigasaki, Japan

[73] Assignee: Matsushita Graphic Communication Systems, Inc., Tokyo, Japan

[21] Appl. No.: 416,360

[22] Filed: Apr. 4, 1995

[30] Foreign Application Priority Data

Apr. 6, 1994 [JP] Japan .................................. 6-068401

[51] Int. Cl.$^6$ ..................................................... G11B 7/00
[52] U.S. Cl. ...................... 369/102; 369/121; 369/44.37; 369/97
[58] Field of Search .................................. 369/110, 102, 369/112, 13, 116, 121, 122, 44.37, 44.38, 97, 109; 250/578.1

[56] References Cited

U.S. PATENT DOCUMENTS

| | | | |
|---|---|---|---|
| 4,822,151 | 4/1989 | Tatsuno et al. | 369/121 |
| 5,093,822 | 3/1992 | Kugiya et al. | 369/121 |
| 5,128,919 | 7/1992 | Narakara et al. | 369/97 |

*Primary Examiner*—Loha Ben
*Attorney, Agent, or Firm*—Rossi & Associates

[57] ABSTRACT

A first optical head comprising: a laser diode (LD) array, including N LDs having N emitting portions respectively arranged in a line at a predetermined interval, for emitting N laser beams of single mode; an optical system for forming a single spot as a pixel on a recording medium from the N laser beams such that images of the N emitting portions are contracted and overlapped each other; and a driver for driving the N LDs according to a single video signal. A second optical head comprising: M LD arrays, each including N LDs having N emitting portions respectively arranged in a line and emitting N laser beams of single mode from the N emitting portions; an optical system for forming M single spots as M pixels on a recording medium from the M of N laser beams such that images of the N emitting portions of each LD arrays are contracted and overlapped each other on the recording medium; and a driver for driving the M LD arrays according to M video signals respectively. Image recording apparatus having a scanning portion using the first or second optical head are also disclosed. In a third optical head, if some of LDs in one LD array deteriorates, a CPU increases drive current supplied to other LDs to compensate the output power. When the drive current exceed the maximum, the CPU stops the recording operation and indicates information.

15 Claims, 6 Drawing Sheets

OPTICAL HEAD AND IMAGE RECORDING APPARATUS INCLUDING THE SAME

BACKGROUND OF THE INVENTION

1. Field of the Invention

This invention relates to an optical head and an image recording apparatus including the same for recording an image on a recording medium using laser light.

2. Description of the Prior Art

An image recording apparatus comprising an optical head including a multi-mode laser diode for emitting a laser beam, a collimating lens system for collimating the laser beam, an objective lens for focusing the collimated laser beam on a recording medium to form a laser beam spot on the recording medium, such as a heat sublimation ink film or a heat melting ink film, and a drive circuit for driving the laser diode in accordance with a video signal to reproduce an image on the recording medium and a scanning mechanism for effecting a scanning operation is known. Another prior art image recording apparatus having a plurality of multi-mode laser diodes for emitting a plurality of laser beams to form a plurality of laser spots, namely, a plurality of pixels, respectively through a similar optical system and through a similar scanning operation is also known.

In these prior art image recording apparatus, because a higher resolution and a higher recording speed are required, a power of the laser diode is increased up to 500 mW. In such a condition, a width of the laser light emitting portion becomes more than 50 μm. Therefore, it is difficult to obtain a small spot on a recording medium, having a high power, for forming each pixel through a general optical system with the multi-mode laser diode.

SUMMARY OF THE INVENTION

The aim of the present invention is to provide an improved optical head and an improved image recording apparatus.

In this invention, a plurality of single-mode laser diodes are used to form a single spot because laser beams are overlapped each other. A laser beam emitted by each single-mode laser diode has a power lower than the multi-mode laser diode. However, a width of a laser light emitting portion is very small. Therefore, a combined spot formed by the plurality of single-mode laser diodes has a sufficient power and a total width of the combined spot is sufficiently small.

According to this invention there is provided a first optical head comprising: a laser diode array, including N laser diodes having N emitting portions respectively arranged in a line at an interval, for emitting N laser beams of single mode from the N emitting portions along the vertical to the line, N being a natural number; an optical system for forming a substantially single spot as a pixel on an image forming plane from the N laser beams such that images of the N emitting portions are contracted and overlapped each other on the image forming plane; and a drive circuit for driving the N laser diodes in accordance with a single video signal.

According to this invention there is also provided a second optical head comprising: M laser diode arrays arranged in a line at a first interval, each including N laser diodes having N emitting portions respectively arranged in the line at a second interval and emitting N laser beams of single mode from the N emitting portions along the vertical to the line, M and N being natural numbers; an optical system for forming M substantially single spots as M pixels on an image forming plane from the M of N laser beams such that images of the N emitting portions of each laser diode arrays are contracted and overlapped each other on the image forming plane; and a drive circuit for driving the M laser diode arrays in accordance with M video signals respectively.

According to this invention there is also provided a third optical head comprising: a laser diode array, having N laser diodes arranged in a line at an interval, for emitting N laser beams of single mode along the vertical to the line, N being a natural number; an optical system for Forming a substantially single spot as a pixel on a recording medium from the N laser beams; a detecting portion, coupled to the N laser diodes for detecting output powers of the N laser diodes; and a drive current control circuit for producing N drive currents supplied to the N laser diodes respectively in accordance with the detected output powers.

In the third optical head, the drive current control circuit produces the drive currents such that a total of the output powers of the detected output powers is constant.

In the third optical head, the drive current control circuit stops producing the drive currents when any of the drive currents exceeds a maximum value.

In the third optical head, the drive current control circuit stops producing the drive currents and indicates information when any of the drive currents exceeds a maximum value.

According to this invention there is further provided a fourth optical head comprising: a laser diode array, having N laser diodes arranged in a line at an interval, for emitting N laser beams of single mode along the vertical to the line, N being a natural number; a micro-lens array, having N first micro-lenses, for collimating the N laser beams respectively, the N laser beams being parallel to each other; a first lens for Focusing the N laser beams from the micro-lens array on a plane to form a first spot having a first width; a second lens, located a first distance apart from the first single spot, for collimating the N laser beams from the first single spot; and a contraction optical system for focusing the N laser beams from the second lens and forming a second single spot having a second width on an image forming plane wherein the second width is smaller than the first width, the N laser diodes are driven in accordance with the same video signal, and the second spot forms a pixel.

In the fourth optical head, the contraction optical system comprises: a convex lens portion for converging the N laser beams from the third micro-lens; a concave lens portion, located a second distance apart from the convex lens portion, for collimating the N laser beams from the convex lens portion; a third lens for spreading the laser beams from the concave lens portion; and an objective lens for focusing the laser beam from the third lens on the image forming plane.

According to this invention there is further provided a fifth optical head comprising: M laser diode arrays arranged in a line at a first interval, each having N laser diodes, arranged in the line at a second interval, for emitting N laser beams of single mode along the vertical to the line, M and N being natural numbers; M first micro-lens array confronting the M laser diode arrays respectively, each having N first micro-lenses, for collimating the N laser beams respectively, the N laser beams being parallel to each other; M second micro-lenses, confronting the M first micro-lens array respectively, focusing the collimated N laser beams on a plane to form M first single spots having a first interval therebetween respectively, each first spot having a first width; M third micro-lenses confronting the M second micro-lenses respectively, located a first distance apart from the M first spots, each collimating the N laser beams from the plane; and a contraction optical system for focusing M of the N laser beams from the M third micro-lenses and forming M second single spots having a second interval therebetween and each second single spot having a second width on a recording medium, wherein the second interval is smaller than the first interval, the second width is smaller than the first width, the M laser diode arrays are driven in accordance with M video signals respectively, and the M second spots form respective pixels.

According to this invention there is provided a sixth optical head comprising: a laser diode array, having N laser diodes arranged in a line at a first interval, for emitting N laser beams of single mode, N being a natural number; a first micro-lens array, having N first micro-lenses, for collimating the N laser beams respectively, the N laser beams being parallel to each other; a second micro-lens for focusing the N laser beams From the first micro-lens array on a plane to form a first single spot having a first width; a contraction optical system for producing a second single spot on an image Forming plane from the first single spot having a second width, the second width being smaller than the first width, the N laser diodes being driven in accordance with the same video signal, and the second single spot form a pixel; a detecting portion, coupled to the N laser diodes for detecting output powers of the N laser diodes; and a drive current control circuit for producing N drive currents supplied to the N laser diodes respectively in accordance with the detected output powers.

According to this invention there is provided a first image recording apparatus comprising any of the above-mentioned optical heads and a scanning portion for two-dimensionally scanning the recording medium using the first optical head.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Figure 1:
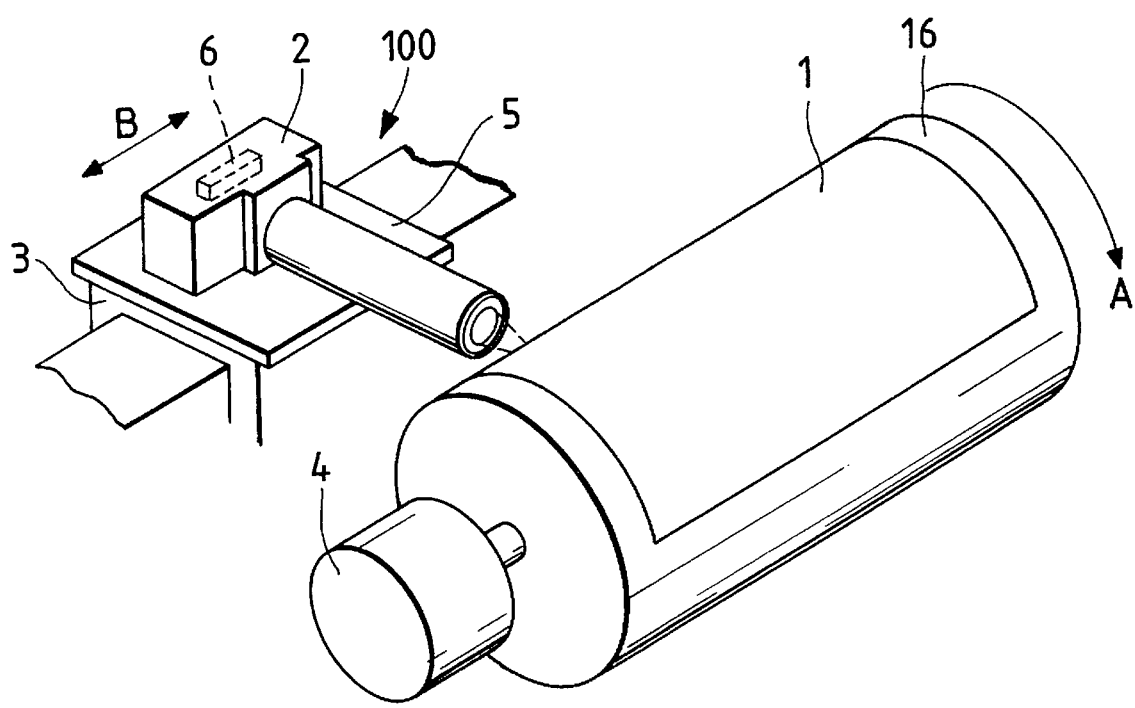
FIG. 1 is a perspective view of an embodiment of an image recording apparatus of this invention.
Figure 2:
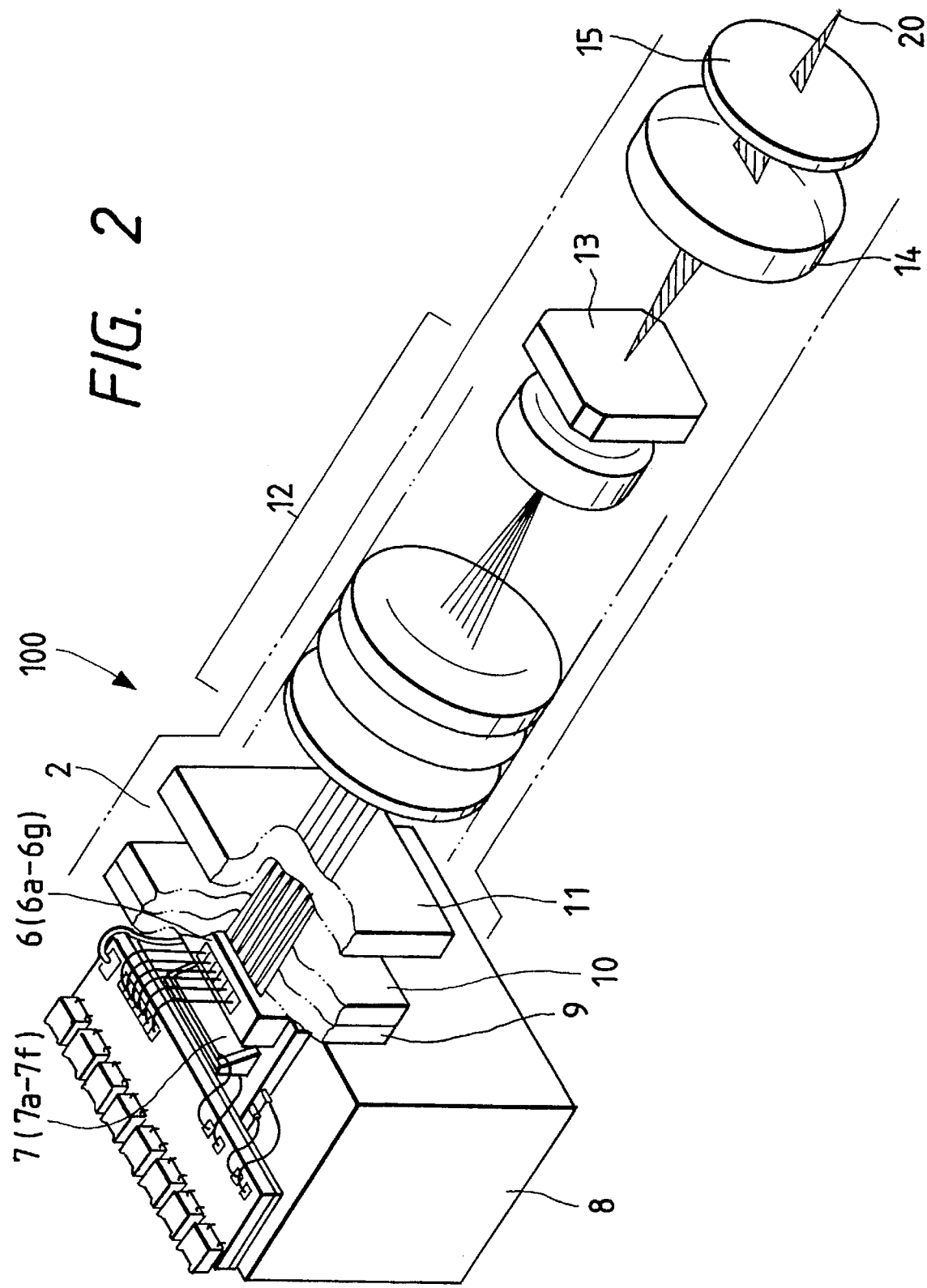
FIG. 2 is an enlarged perspective view of the embodiment illustrating the optical head unit shown in FIG. 1.
Figure 3:
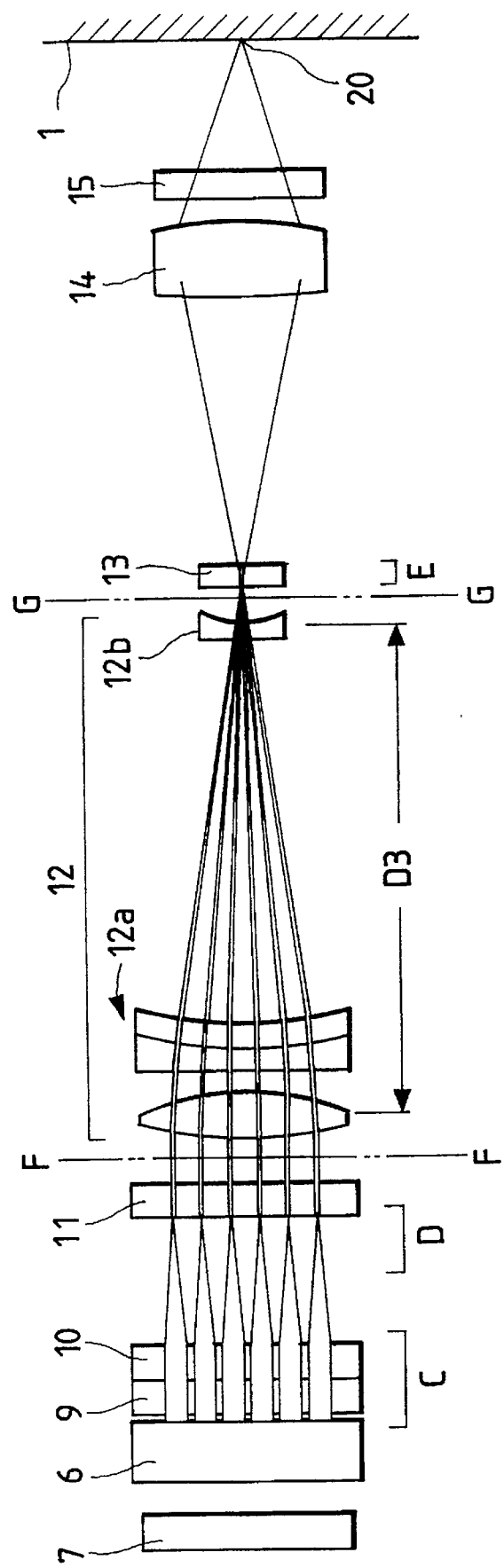
FIG. 3 is a plan view of the embodiment illustrating an optical system of the optical head unit shown in FIG. 1.
Figure 4:
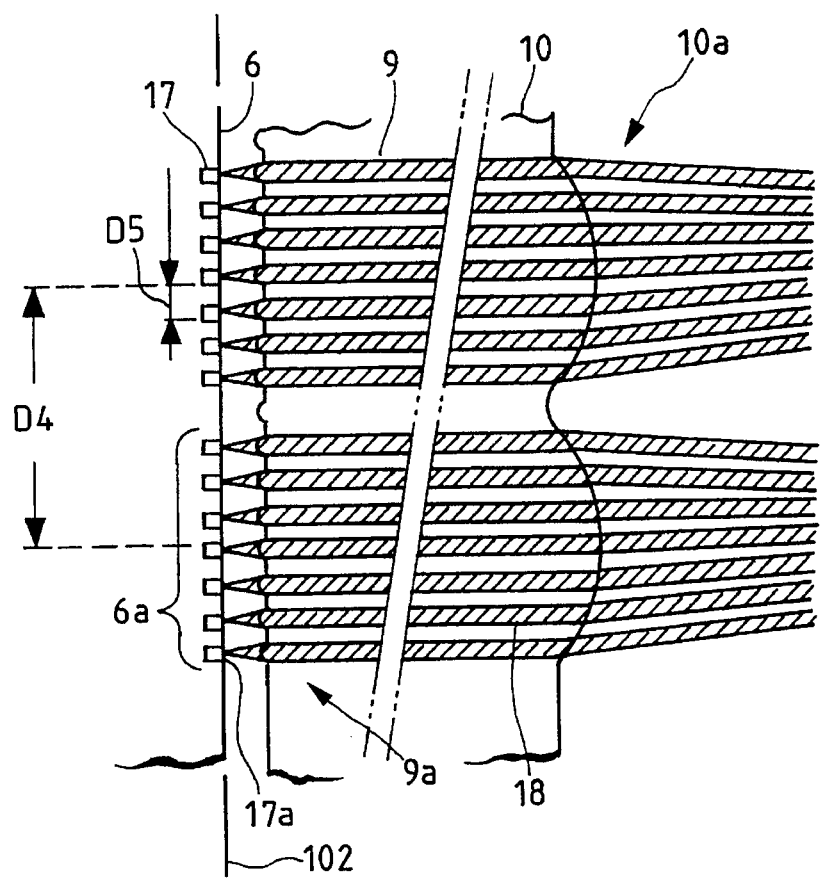
FIG. 4, 5, and 6 are partial enlarged cross-sectional views of the embodiment of the optical head unit shown in FIG. 1.
Figure 5:
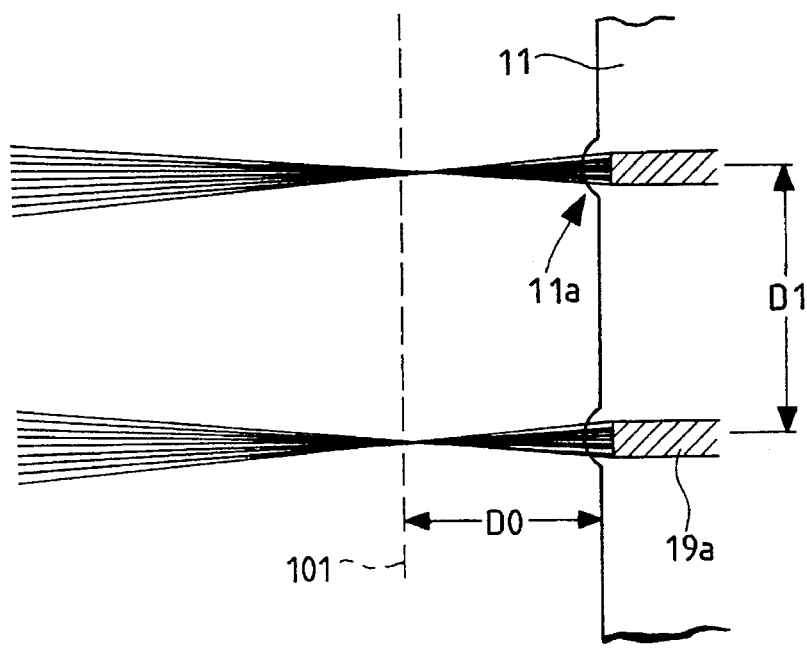
Figure 6:
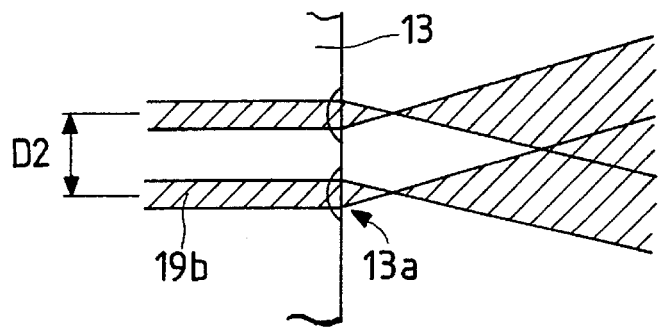
Figure 7:
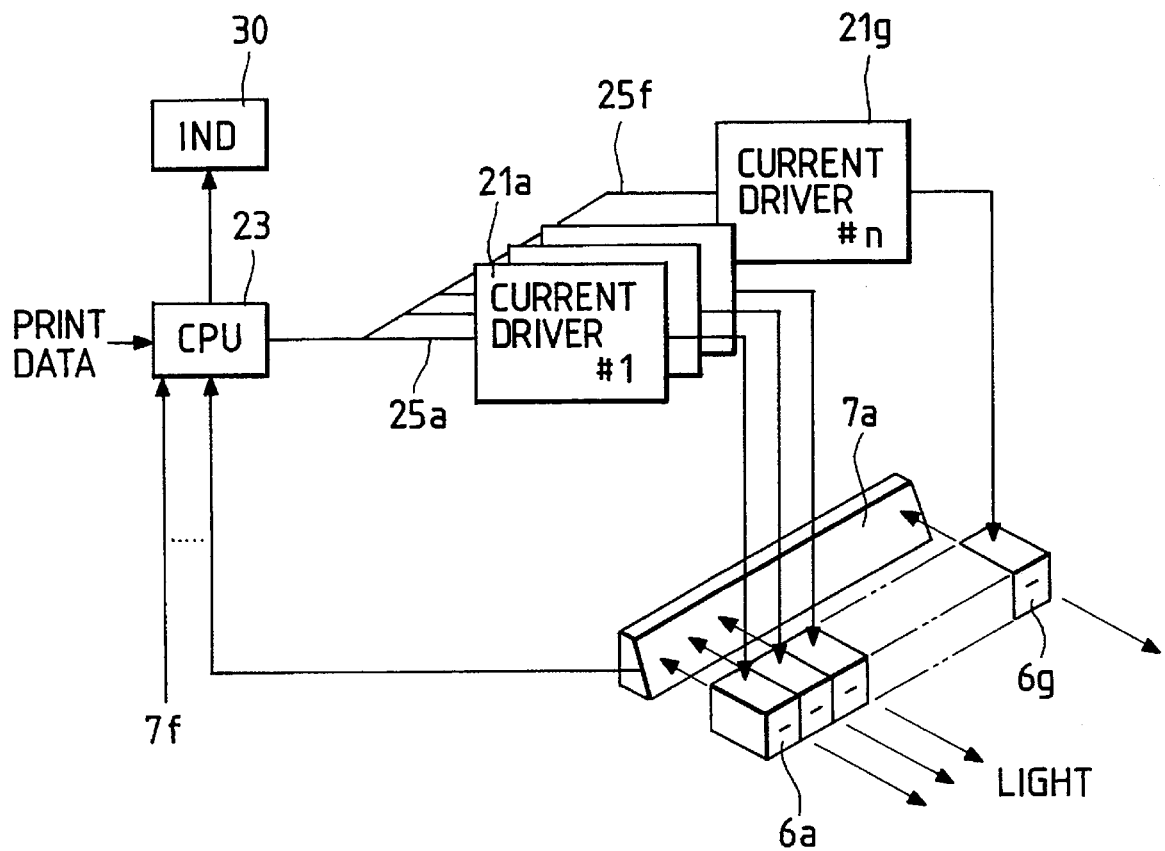
FIG. 7 is a block diagram of the embodiment showing a drive current control portion.

Hereinbelow will be described an embodiment of this invention. FIG. 1 is a perspective view of the embodiment. An image recording apparatus comprising an optical head unit 100 for emitting laser light for recording, a scanning mechanism for two-dimensionally scanning a recording medium by the laser light to form an image. The scanning mechanism has a carriage system, including a linear motor 3, for moving the optical head unit 100 horizontally (in the direction B) and rotary cylinder 16 driven by a spindle motor 4 for rotating a recording medium in a rotational direction A. FIG. 2 is an enlarged perspective view of the embodiment illustrating the optical head 100. FIG. 3 is a plan view of the embodiment illustrating an optical system of the optical head 100. FIGS. 4, 5, and 6 are partial enlarged cross-sectional views of the embodiment of the optical head unit 100. FIG. 7 is a block diagram of the embodiment of a driving current control portion.

The optical head 100 comprises a laser diode package 6 including six laser diode arrays 6a-6g arranged in a line 102 at an interval D4, each having seven single-mode laser diodes arranged in the line 102 at an interval D5 in the horizontal direction B, a first micro-lens array 9, having six groups of seven first micro-lenses 9a aligned with (confronting) respective optical axes of the laser diodes, for collimating each laser beam emitted by each single-mode laser diode, a second micro-lens array 10, having six second micro-lenses 10a, each second micro-lens focusing the collimated laser beams generated by each of laser diode array on a focus plane 101 to form substantially one focus spot, a third micro-lens array 11, having six third micro-lenses 11a separated from the focus plane 101 by a distance D0, each third micro-lens 11a collimating laser beams via the substantially one focus spot, for producing a collimated combined beam including six parallel beams having distances D1 therebetween on a cross-sectional plane F—F, a contraction optical system 12 for producing a contracted collimated combined beam including six parallel beams having distances D2 therebetween on the cross-sectional plane G—G made small, a fourth micro-lens array 13, having six micro-lenses 13a for spreading the beams 19b at a predetermined angle, an objective lens 14 For focusing the spread beams from the fourth micro-lens array 13 on a substantially single spot 20 on the recording medium 1 as an image forming plane, a cover glass 15 for protecting the objective lens 15, a monitor photo-diode circuit 7 for detecting an intensity of laser beams from any of the laser diode arrays 6a–6g, and a cooler for cooling the laser diode array package 6.

The distance D1 between the third micro-lenses corresponds to the distance D4 between diode arrays 6a–6g. The contraction optical system 12 comprises a convex portion 12a and a concave portion 12b having a distance D3 therebetween.

As shown in FIG. 4, each of laser diode arrays 6a–6g has seven single-mode laser diodes 17 arranged in the horizontal direction B emitting seven beams slightly spread from an emitting portion.17a. Each first micro-lens 9a collimates each laser beam emitted by each single-mode laser diode 17. Each second micro-lens 10a focuses the collimated laser beams 18 generated by each of laser diode arrays 6a–6g on a focus plane 101 to form a substantially single focus spot as shown in FIG. 5. This is because the laser beam emitted by each of the laser diode 17 is collimated by the micro-lens 9a with each of micro-lens aligned with the optical axis of each laser diode 17, so that the laser beams 18 are parallel with each other and each of the laser beams 18 is collimated. Accordingly, the convex lens of each micro lens 10a forms a substantially single spot from the laser beams 18 from each of laser diode arrays 6a–6g on the focus plane 101. In other words, seven laser beams 18 entering each second micro-lens 10a are assumed as a light coming from an infinity.

Therefore, each second micro-lens 10a forms a substantially single spot on the focus plane 101.

Each third micro-lens 11a collimates laser beams coming via the focus spot on the focus plane 101 to produce the collimated combined beam 19a including seven parallel beams. The six collimated combined beams from the third micro-lens array 11 have distances D1 therebetween on a cross-sectional plane F—F. The contraction optical system 12 produces a contracted collimated combined beam including six parallel beams having distances D2 therebetween on the cross-sectional plane G-G made small. More specifically, the convex portion 12a converges the six collimated combined beams from the third micro-lens array 11 and the concave portion 12b collimates the converged beams, so that the collimated beams from the concave portion 12b have a smaller distance therebetween than that of the six collimated combined beams from the third micro-lens array The fourth micro-lens array 13, having six micro-lenses 13a for spreading the combined beams 19b. The objective lens 14 focuses the beams from the fourth micro-lens array 13 on a substantially single spot 20 on the recording medium 1. Therefore, the beams emitted by the seven laser diode 17 of each laser diodes 6a–6g forms the substantially single spot representing a pixel. The other laser diode arrays also produced substantially signal spots in accordance with respective drive currents to form pixels. Therefore, six laser diode arrays 6a–6g produce six pixels in accordance with drive currents respectively.

As described above, on the focus plane 101, one of laser diode arrays 6a–6g produces the substantially single spot having a width through the first micro-lenses 9a, second micro-lens 10a, and third micro-lens 11a. Therefore, the substantially single spot (pixel) having a second width is also formed on the recording medium 1 through the contraction optical system 12, the fourth micro-lens 13a and the objective lens 14. Therefore, the second width is smaller than the first width and distances between pixels are smaller than the distance D1.

The inventor made a measurement using this image recording apparatus. As described, one of laser diode arrays 6a–6g has seven laser diodes and one laser diode has one emitting point. A width of one emitting point is 3 μm when a total output power is 500 mW and each substantially signal spot on the recording medium 1 has a sufficiently small width. Therefore, an image is recorded at a high resolution at a high speed without a complicated lens system.

In this embodiment, six laser diode arrays 6a–6g are used. However, an optical head is provided using only one laser diode array 6a and one group of the first micro-lens array, a second micro-lens (lens) 10a third micro-lens (lens) 11a fourth micro-lens (lens) 13a the contraction optical system 12, and the objective lens 14 to form a single spot, wherein images of the emitting portions of laser diodes contracted and overlapped each other on the recording medium (an image forming plane) by omitting some parts from the above mentioned embodiment.

As described, in this embodiment, a plurality of laser diode arrays 6a–6g, each having a plurality of emitting points, namely, single-mode laser diodes 17 wherein all laser diodes 17 of each laser diode array are driven in response to the same video signal. Though an output power of each single mode laser diode 17 is relatively lower than a multi-mode laser diode, the spot on formed on the recording medium 1 corresponding to each of laser diodes 6a –6g includes six laser beams produced by each of laser diode array mixed. Therefore, a total output power of each pixel is sufficient with a width of the spot made small. Accordingly, a high resolution and a high speed recording is provided.

A driving current control portion will be described. The laser output powers of the laser diode arrays 6a–6g are controlled to compensate for a decrease in the laser output power of some laser diode arrays 6 due to occurrence of deteriorated laser diodes or the like.

A photo diode array 7 has six photo diodes 7a–7f coupled to laser diodes 6a–6g respectively. For example the photodiodes 7a monitor the laser output power of the laser diode array 6a and supplies detected output power of the laser diode array 6 to a central processing unit (CPU) 23. Then, in the image forming operation, the CPU 23 generates six drive current control signals 25a–25f in accordance with print data and the detected output power data. Current drivers 21a to 21f supply current drive signals to respective laser diode arrays 6a–6f. The laser diodes arrays 6a–6f emit laser beams in accordance with the supplied current drive signals respectively.

Figure 8:
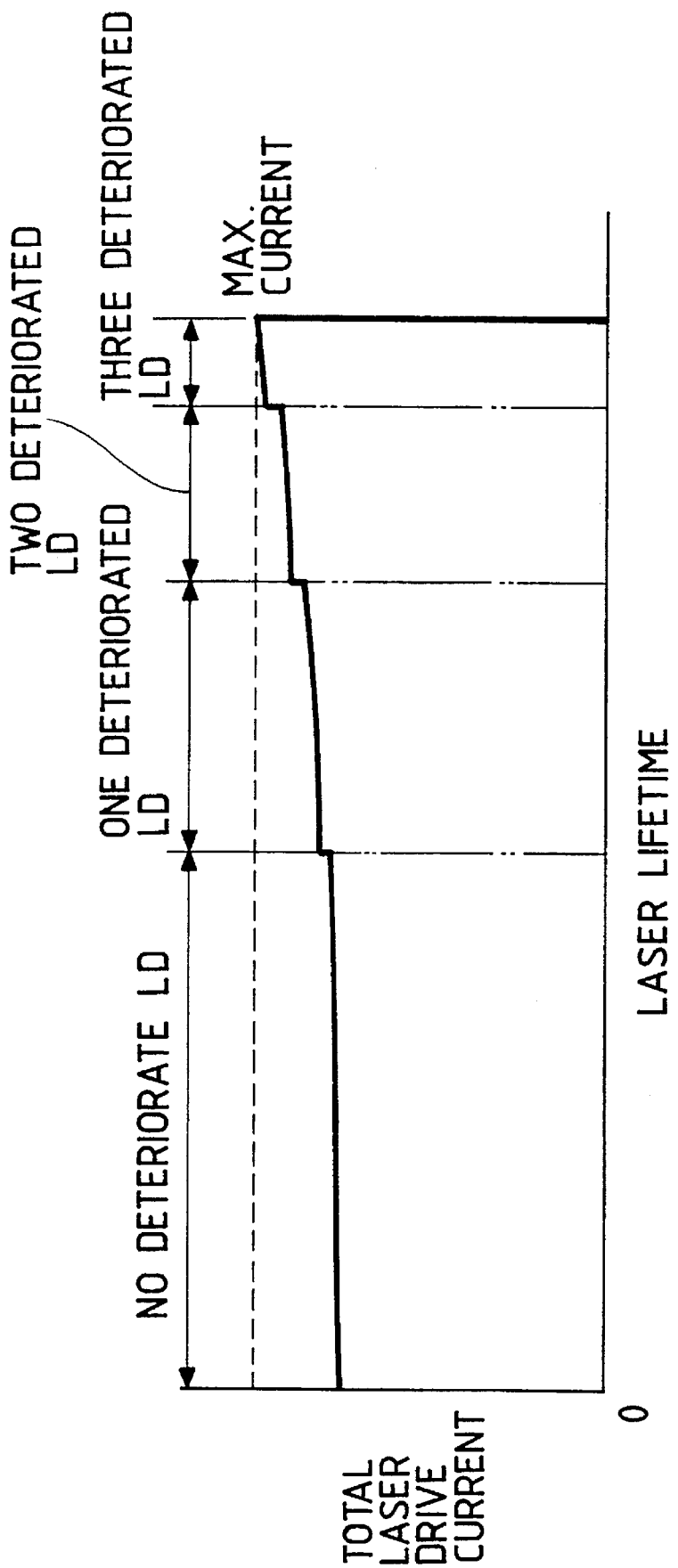
FIG. 8 is an illustration of the embodiment showing a drive current control operation.

The CPU 23 controls currents supplied to respective laser diodes on the basis of the detected output power data through the drive current control signals. That is, the CPU 23 controls such that a total output power of laser diode arrays 6 is constant in the ON-state. If there are some laser diodes deteriorated in a laser diode array 6a for example, the CPU 23 controls the drive current supplied to the laser diode 6a to make the total output power of the laser diodes 17 in the laser diode array 6a constant by monitoring the output of the photodiode 7a. Therefore, the power of laser beams on a spot is not changed though some laser diode arrays are deteriorated. As a result, the recorded image is not affected from the deterioration of some laser diode arrays. However, if the drive currents exceeds the maximum value, i.e., the deterioration exceeds to a predetermined degree, the CPU 23 stops the driving the laser diode arrays and informs the user of the deterioration of the laser diode arrays by an indicator 30. In this embodiment, three laser diodes out of seven laser diodes are allowed to be in the deteriorated condition. That is, the total output power of a laser diode array can be controlled to be constant up to three deteriorated laser diodes. FIG. 8 is an illustration of the embodiment showing a drive current control operation. A total current of one laser diode array an increased with increase of the number of the deteriorated laser diodes. At the initial condition, all seven laser diodes emit laser beams suitably. Therefore, the total drive current is relatively low. When one laser diode of one laser diode array is deteriorated, the CPU 23 increases the drive current supplied to the laser diode array stepwise to maintain the total laser output power of the pixel constant. Because the total current reaches the max value when three laser diodes in one laser diode array deteriorate, if more than three laser diodes in one laser diode array deteriorate, the CPU 23 stops the recording operation and informs the user of the defective condition by the indicator 30. In other words, the CPU 32 judges the defective condition by that if the CPU 32 supplies a drive current having an approximately max value but the detected output power does not reach the allowable output power.

As mentioned, because the pixel is formed by laser beams emitted by a plurality of laser diodes, if some laser diodes among them deteriorates, this optical head 100 can records image as it is. Therefore, as shown in FIG. 8, a total lifetime of the laser diode array is extended compared with a single laser diode forming a pixel.

What is claimed is:

1. An optical head comprising:
   a laser diode array, including N laser diodes having N emitting portions respectively arranged in a line at a predetermined interval, for emitting N laser beams of single mode from said N emitting portions along a vertical to said line, N being a natural number;

an optical system for forming a substantially single spot as a pixel on an image forming plane from said N laser beams such that images of said N emitting portions are contracted and overlapped each other on said image forming plane; and a drive circuit for driving said N laser diodes in accordance with a single video signal.

2. An optical head comprising:

M laser diode arrays arranged in a line at a first interval, each including N laser diodes having N emitting portions respectively arranged in said line at a second interval and emitting N laser beams of single mode from said N emitting portions along a vertical to said line, M and N being natural numbers;

an optical system for forming M substantially single spots as M pixels on an image forming plane from said M of N laser beams such that images of said N emitting portions of each laser diode arrays are contracted and overlapped each other on said image forming plane; and a drive circuit for driving said M laser diode arrays in accordance with M video signals respectively.

3. An optical head comprising:

a laser diode array, having N laser diodes arranged in a line at a predetermined interval, for emitting N laser beams of single mode along a vertical to said line, N being a natural number;

an optical system for forming a substantially single spot as a pixel on a recording medium from said N laser beams;

a detecting portion, coupled to said N laser diodes for detecting output powers of said N laser diodes; and a drive current control circuit for producing N drive currents supplied to said N laser diodes respectively in accordance with said detected output powers.

4. An optical head as claimed in claim 3, wherein said drive current control circuit produces said drive currents such that a total of said output powers of said detected output powers is constant.

5. An optical head as claimed in claim 3, wherein said drive current control circuit stops producing said drive currents when any of said drive currents exceeds a maximum value.

6. An optical head as claimed in claim 3, wherein said drive current control circuit stops producing said drive currents and indicates information when any of said drive currents exceeds a maximum value.

7. An optical head comprising:

a laser diode array, having N laser diodes arranged in a line at a predetermined interval, for emitting N laser beams of single mode along a vertical to said line, N being a natural number;

a micro-lens array, having N first micro-lenses, for collimating said N laser beams respectively, said N laser beams being parallel to each other;

a first lens for focusing said N laser beams from said micro-lens array on a plane to form a first single spot having a first width;

a second lens, located a first distance apart from said first single spot, for collimating said N laser beams from said first single spot; and a contraction optical system for focusing said N laser beams from said second lens and forming a second single spot having a second width on an image forming plane wherein said second width is smaller than said first width, said N laser diodes are driven in accordance with the same video signal, and said second spot forms a pixel.

8. An optical head as claimed in claim 7, wherein said contraction optical system comprises:

a convex lens portion for converging said N laser beams from said second lens;

a concave lens portion, located a second distance apart from said convex lens portion, for collimating said N laser beams from said convex lens portion;

third lens for spreading said laser beams from said concave lens portion; and an object lens for focusing said laser beam from said third lens on said image forming plane.

9. An optical head comprising:

M laser diode arrays arranged in a line at a first interval, each having N laser diodes, arranged in said line at a second interval, for emitting N laser beams of single mode along a vertical to said line, M and N being natural numbers;

a first micro-lens array including M groups of first micro-lenses confronting said M laser diode arrays respectively, each of said M groups having N first micro-lenses, for collimating said N laser beams respectively, said N laser beams being parallel to each other;

M second micro-lenses, confronting said M groups of first micro-lenses respectively, focusing said collimated N laser beams on a plane to form M first single spots having a first interval therebetween respectively, each first spot having a first width;

M third micro-lenses confronting said M second micro-lenses respectively, located a first distance apart from said M first spots, each collimating said N laser beams from said plane; and a contraction optical system for focusing M of said N laser beams from said M third micro-lenses and forming M second single spots having a second interval therebetween and each second single spot having a second width on a recording medium, wherein said second interval is smaller than said first interval, said second width is smaller than said first width, said M laser diode arrays are driven in accordance with M video signals respectively, and said M second spots for respective pixels.

10. An optical head comprising:

a laser diode array, having N laser diodes arranged in a line at a first interval, for emitting N laser beams of single mode, N being a natural number;

a first micro-lens array, having N first micro-lenses, for collimating said N laser beams respectively, said N laser beams being parallel to each other;

a second micro-lens for focusing said N laser beams from said first micro-lens array on a plane to form a first single spot having a first width;

a contraction optical system for producing a second single spot on an image forming plane from said first single spot having a second width, said second width being smaller than said first width, said N laser diodes being driven in accordance with the same video signal, and said second single spot forming a pixel;

a detecting portion, coupled to said N laser diodes for detecting output powers of said N laser diodes; and a drive current control circuit for producing N drive currents supplied to said N laser diodes respectively in accordance with said detected output powers.

11. An optical head as claimed in claim 10, wherein said drive current control circuit produces said drive currents such that a total of said output powers of said detected output powers is constant.

12. An optical head as claimed in claim 10, wherein said drive current control circuit stops producing said drive currents when any of said drive currents exceeds a maximum value.

13. An optical head as claimed in claim 10, wherein said drive current control circuit stops producing said drive currents and indicates information when any of said drive currents exceeds a maximum value.

14. An image recording apparatus comprising:

an optical head including:
- a laser diode array, having N laser diodes arranged in a line at a predetermined interval, for emitting N laser beams of single mode along a vertical to said line, N being a natural number;
- a micro-lens array, having N first micro-lenses, for collimating said N laser beams respectively, said N laser beams being parallel to each other;
- a first lens for focusing said N laser beams from said micro-lens array on a plane to form a first single spot having a first width;
- a second lens, located a first distance apart from said first single spot, for collimating said N laser beams from said first single spot; and
- a contraction optical system for focusing said N laser beams from said second lens and forming a second single spot having a second width on a recording medium wherein said second width is smaller than said first width, said N laser diodes are driven in accordance with the same video signal, and said second spot forms a pixel; and a scanning portion for two-dimensionally scanning said recording medium with said optical head.

15. An image recording apparatus comprising:

an optical head comprising:
- H laser diode arrays arranged in a line at a first interval, each having N laser diodes, arranged in said line at a second interval, for emitting N laser beams of single mode along a vertical to said line, M and N being natural numbers;
- a first micro-lens array including M groups of first micro-lenses confronting said M laser diode arrays respectively, each of said M groups having N first micro-lenses, for collimating said N laser beams respectively, said N laser beams being parallel to each other;
- M second micro-lenses, confronting said M groups of first micro-lenses respectively, each focusing said collimated N laser beams on a plane to form M first single spots having a first interval therebetween respectively, each first spot having a first width;
- M third micro-lenses confronting said M second micro-lenses respectively, located a first distance apart from said M first spots, each collimating said N laser beams from said plane;
- a contraction optical system for focusing M of said N laser beams from said M third micro-lenses and forming M second spots having a second interval therebetween and each second spot having a second width on a recording medium, wherein said second interval is smaller than said first interval, said second width is smaller than said first width, said M laser diode arrays are driven in accordance with M video signals respectively, and said M second spots forms respective pixels; and
- a scanning portion for two-dimensionally scanning said recording medium with said optical head.

* * * * *